(12) United States Patent
Liu et al.

(10) Patent No.: US 9,930,554 B2
(45) Date of Patent: Mar. 27, 2018

(54) METHODS AND DEVICES FOR LINK ADAPTATION

(71) Applicant: Telefonaktiebolaget L M Ericsson (publ), Stockholm (SE)

(72) Inventors: Jinhua Liu, Beijing (CN); Svante Bergman, Hägersten (SE); Shaohua Li, Beijing (CN); Zhan Zhang, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 72 days.

(21) Appl. No.: 14/900,528

(22) PCT Filed: Jun. 25, 2013

(86) PCT No.: PCT/CN2013/077851
§ 371 (c)(1),
(2) Date: Dec. 21, 2015

(87) PCT Pub. No.: WO2014/205644
PCT Pub. Date: Dec. 31, 2014

(65) Prior Publication Data
US 2016/0157118 A1 Jun. 2, 2016

(51) Int. Cl.
*H04W 24/10* (2009.01)
*H04L 1/20* (2006.01)
(Continued)

(52) U.S. Cl.
CPC .......... *H04W 24/10* (2013.01); *H04L 1/0003* (2013.01); *H04L 1/0009* (2013.01);
(Continued)

(58) Field of Classification Search
CPC ...... H04W 24/10; H04L 1/203; H04L 1/0003; H04L 1/0021; H04L 5/0035; H04L 5/0055; H04L 5/0057; H04L 1/0009; Y02B 60/31; Y02B 60/03; H04B 7/024
See application file for complete search history.

(56) References Cited

U.S. PATENT DOCUMENTS

2004/0100911 A1 5/2004 Kwan et al.
2006/0160556 A1 7/2006 Mueller et al.
(Continued)

FOREIGN PATENT DOCUMENTS

WO   WO 2012/116485 A1   9/2012
WO   WO 2013/053135 A1   4/2013

OTHER PUBLICATIONS

International Search Report and Written Opinion of the International Searching Authority, Application No. PCT/CN2013/077851, dated Mar. 27, 2014.
(Continued)

*Primary Examiner* — Kwang B Yao
*Assistant Examiner* — Moo Ryong Jeong
(74) *Attorney, Agent, or Firm* — Patent Portfolio Builders, PLLC

(57) ABSTRACT

The present disclosure relates to a method performed in a network node with two or more transmission states for dynamically managing outer loop link adaptation instances for a wireless device. The method includes monitoring one or more variables, where each variable is either associated with an outer loop link adaptation instance or with a transmission state; and adapting the number of outer loop link adaptation instances based on the monitored one or more variables. The disclosure also relates to corresponding devices.

24 Claims, 4 Drawing Sheets

(51) Int. Cl.
    *H04L 1/00*      (2006.01)
    *H04L 5/00*      (2006.01)
    *H04B 7/024*     (2017.01)

(52) U.S. Cl.
    CPC ............ *H04L 1/0021* (2013.01); *H04L 1/203* (2013.01); *H04L 5/0035* (2013.01); *H04L 5/0055* (2013.01); *H04L 5/0057* (2013.01); *H04B 7/024* (2013.01); *Y02B 60/31* (2013.01)

(56) References Cited

U.S. PATENT DOCUMENTS

| | | | | |
|---|---|---|---|---|
| 2009/0128410 A1* | 5/2009 | Li | ........................ | H04B 7/0426 |
| | | | | 342/367 |
| 2010/0284454 A1 | 11/2010 | Oteri et al. | | |
| 2012/0093118 A1* | 4/2012 | Peters | ................... | H04L 1/0081 |
| | | | | 370/329 |
| 2013/0182569 A1* | 7/2013 | Bertrand | ............... | H04L 1/0009 |
| | | | | 370/232 |
| 2014/0307645 A1* | 10/2014 | Ji | ........................ | H04L 1/0003 |
| | | | | 370/329 |
| 2015/0155966 A1* | 6/2015 | Zeng | ..................... | H04L 1/0003 |
| | | | | 370/329 |

OTHER PUBLICATIONS

Supplementary European Search Report for European Patent Application No. 13 88 8122, 2 pages (Jan. 24, 2017).

* cited by examiner

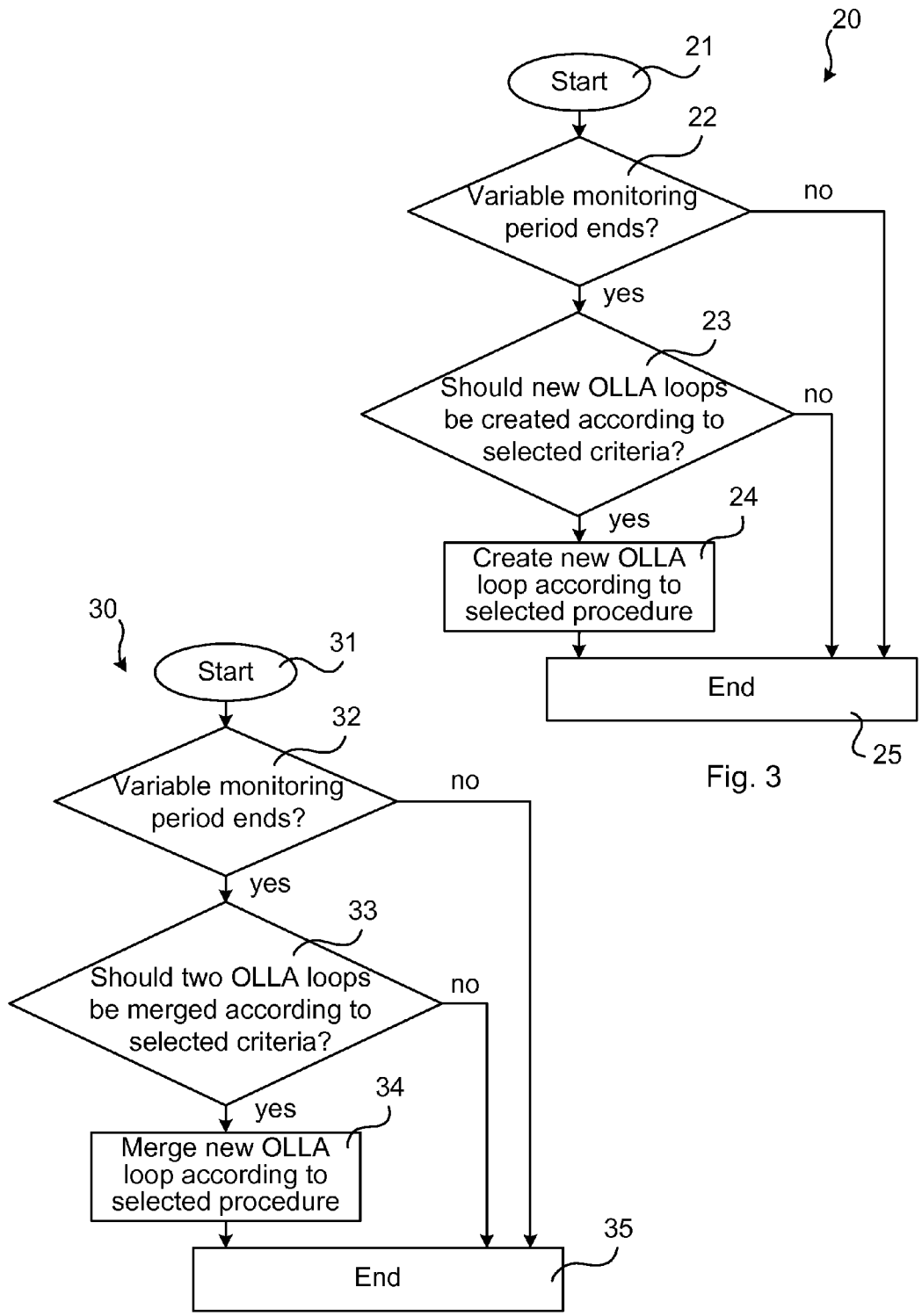

US 9,930,554 B2

METHODS AND DEVICES FOR LINK ADAPTATION

CROSS REFERENCE TO RELATED APPLICATION

This application is a 35 U.S.C. § 371 national stage application of PCT International Application No. PCT/CN2013/077851, filed on Jun. 25, 2013, the disclosure and content of which is incorporated by reference herein in its entirety. The above-referenced PCT International Application was published in the English language as International Publication No. WO 2014/205644 A1 on Dec. 31, 2014.

TECHNICAL FIELD

The technology disclosed herein relates generally to the field of wireless communication, and in particular to link adaptation using outer loop link adaptation algorithms and handling thereof.

BACKGROUND

Coordinated multi-point (CoMP) is a feature introduced for Long Term Evolution (LTE) Advanced. CoMP enables a dynamic coordination of downlink (DL) connections and uplink (UL) connections with several different network points, e.g. antenna points, for a wireless device.

Coordination can take many forms and DL coordination schemes are typically classified into different DL CoMP modes. In 3GPP, several DL CoMP modes are being discussed and will be supported in the specification as of LTE Release 11. In the following, three examples of CoMP modes, which are among the most commonly discussed in the context of LTE Release 11, will be briefly described. Within a CoMP enabled communication network the transmissions from transmission points (TPs) are coordinated.

FIG. 1a illustrates a first example of a CoMP mode, comprising Dynamic Point Selection (DPS). DPS may be implemented in a communication network 1 comprising several TPs 2, 3. A TP 3 is dynamically selected to serve a wireless device 4 within a group of cooperative candidate TPs 2, 3. The selection may be based on different criteria, and is typically aimed at improving the DL throughput for the wireless device 4 or the overall system performance in general. The selected TP for the wireless device 4 may change dynamically, based e.g. on which TP has the highest received signal to interference plus noise ratio (SINR).

FIG. 1b illustrates a second example of a CoMP mode, comprising Dynamic Point Blanking (DPB). In DPB, the network 1 may actively and dynamically mute data transmissions from one or more TPs 2, 3 in order to reduce the interference experienced by wireless devices 4, 5 that are scheduled for DL transmission in neighboring cells.

FIG. 1c illustrates a third example of a CoMP mode, comprising Non-coherent Joint Transmission (NJT). In this CoMP mode more than one TP 2, 3 transmit the same data signal simultaneously to the wireless device 4. The wireless device 4 receives a superposition of the desired signals that has propagated over the different TP specific channels. The jointly transmitted signal can raise an average ratio between signal and noise plus interference. As a consequence, the DL signal quality is improved.

In LTE, a wireless device is expected to measure the DL radio link quality and send reports with this channel state information (CSI) to network nodes, e.g. eNodeB. For each link between a TP and the wireless device, CSI includes Channel Quality Indicator (CQI) (wideband or sub-band CQI), Rank Indicator (RI) and Precoding Matrix Indicator (PMI). In LTE the CSI content and its measurements depends on what DL transmission mode (TM) the wireless device is configured with. For instance, in TM 1 or 2, there is only a CQI measurement and report. In TM3, there are CQI and RI measurement reports. In TM4 and TM9, the wireless device should measure and report CQI, RI and PMI on a serving DL link. TM 10, introduced in LTE Rel.11, supports multiple so called CSI Processes. Each CSI Process specifies an interference measurement and a channel measurement that is used for a corresponding sequence of CSI reports (CQI, RI, and PMI). The CSI Processes may assume different serving TPs, implicitly given by the CSI-RS, as well as different interference hypotheses, given by the CSI-IM (IM, Interference Measurement) measurement. For transmission modes in LTE, refer to 3GPP Specification 36.814.

In Rel.11, the CoMP modes described with reference to FIGS. 1a, 1b and 1c are to be introduced. CSI in any of the mentioned CoMP modes have to include measurements for more links from the cooperating TPs to enable the effective operations of these CoMP modes. For instance, for DPS, accurate CSI is highly valuable and include link information from all cooperating candidate TPs so that the communication network can select the best TP to serve the wireless device. For NJT, some form of CSI regarding the estimated composite channel from at least two cooperating TPs serving the wireless device is instrumental in order to perform accurate link adaptation.

For DPB, CSI for the cases when blanking is enabled as well as disabled it is important for the network node, in particular the eNodeB, to determine an accurate modulation and coding scheme (MCS) and to capture the blanking gain.

In LTE, the reported CQI represents a recommended transport format that, if scheduled for DL transmission, should result in a specific average block error rate (BLER). These CQI reports are however prone to systematic errors, partly due to properties of the radio channel, which the eNodeB should take into account when performing link adaptation. The eNodeB may further use other sources of CSI to improve the link adaptation, such as reference signal received power (RSRP) measurements and/or channel reciprocity measurements, all with a varying degree of imperfections.

In order to ensure that a target BLER is fulfilled regardless of the CSI imperfections, the eNodeB commonly employs an outer loop link adaptation (OLLA) algorithm.

Currently, a so-called jumping algorithm is widely used for OLLA in the wireless communication systems. Based on Hybrid Automatic-Repeat-Request Acknowledgement/Negative acknowledgement (HARQ ACK/NACK) feedbacks from the wireless device, the eNodeB adjusts a radio quality compensation value (referred to as delta value or SINR adjustment value hereinafter), which is used to correct the DL radio channel quality measurement report from the wireless device or the estimated DL radio channel quality by the eNodeB. Below is a formula that exemplifies the jump algorithm:

$$\Delta_{delta} = \begin{cases} \Delta_{delta} - StepSize & (HARQ\ NACK \text{ is received}) \\ \Delta_{delta} + StepSize \cdot \dfrac{BLER_{tgt}}{1 - BLER_{tgt}} & (HARQ\ ACK \text{ is received}) \end{cases} \quad \text{Equation 1}$$

Where $\Delta_{delta}$ is the delta value for SINR adjustment, typically in dB scale; $BLER_{tgt}$ is the target BLER.

The eNodeB estimates the wireless device measured DL SINR ($SINR_{cqi}$) from the CQI report received from the wireless device. By using the OLLA SINR adjustment Δ, the eNodeB can derive the adjusted DL SINR ($SINR_{adjusted}$) that is finally used for MCS selection and radio resource assignment. The adjusted DL SINR can be expressed as the following formula, all in the logarithmic scale:

$$SINR_{adjusted} = \Delta + SINR_{cqi} \qquad \text{Equation 2}$$

As a consequence, the eNodeB selects the downlink MCS and assigns the corresponding radio resources taking the corrected radio channel qualities into account. If the OLLA converges properly this procedure will eventually ensure that the target BLER is reached.

In many present and future wireless communication systems, a wireless device may thus be served in parallel by the one or multiple transmission points, over one or many carriers or sub-bands, for example in accordance with the earlier described CoMP transmission modes, but also by multi-user multiple-input multiple-output (MU MIMO) techniques or carrier aggregation. In order to make full use of the downlink radio resources it is important to maintain robust and accurate link adaptation. For such a wireless device, the different radio channel characteristics of different transmission states can be either similar or quite different, which may result in, for instance, considerable differences in accuracy and/or life time of the reported CSI. Link adaptation has become increasingly more challenging due to such changing radio channel characteristics that depend on the transmission scheme. Since each specific configuration of the transmission scheme often means distinct radio link characteristics, the existing link adaptation methods are inadequate and improvements are needed to capture these circumstances.

SUMMARY

One way to address the above problem is for the network to maintain one or multiple Outer Loop Link Adaptation (OLLA) loops corresponding to the different transmission states.

However, maintaining multiple OLLA loops for different transmission states leads to fewer HARQ ACK/NACK samples for each loop, with the consequence that each OLLA loop takes more time to converge and can not sufficiently well track the systematic radio channel measurement errors. Scheduling based on multiple OLLAs that are not properly converged may lead to suboptimal decisions and eventually suboptimal system performance. On the other hand, if a single OLLA loop is maintained for all transmission states, then the generated SINR adjustment may be suboptimal for all transmission states, also leading to suboptimal system performance.

An object of the invention is to overcome or at least alleviate one or more of the mentioned shortcomings of the prior art.

The object is according to a first aspect achieved by a method in a network node with two or more transmission states for dynamically managing outer loop link adaptation instances for a wireless device. The method comprises monitoring one or more variables, wherein each variable is either associated with an outer loop link adaptation instance or with a transmission state; and adapting the number of outer loop link adaptation instances based on the monitored one or more variables.

By dynamically adapting the number of outer loop link adaptation instances based on monitored variables, such as measured BLER, for the particular wireless devices, the link adaptation is improved. With the improved link adaptation, prerequisites are given for enabling the provision of best possible communication quality for the particular wireless device. Improved scheduling decisions also results from the improved link adaption, thus providing improved overall system performance. For the particular case of DL CoMP, the method also provides improved tracking of link status change at different DL CoMP states for DPS, DPB and NJT CoMP operations.

The object is according to a second aspect achieved by a network node with two or more transmission states for dynamically managing outer loop link adaptation instances for a wireless device. The network node comprises a processor and memory. The memory contains instructions executable by the processor, whereby the network node is operative to: monitor one or more variables, wherein each variable is either associated with an outer loop link adaptation instance or with a transmission state; and adapt the number of outer loop link adaptation instances based on the monitored one or more variables.

Advantages corresponding to the above are obtained also by this aspect.

The object is according to a third aspect achieved by a computer program for a network node with two or more transmission states for dynamically managing outer loop link adaptation instances for a wireless device. The computer program comprising computer program code, which, when run on the network node causes the network node to: monitor one or more variables, each variable is either associated with an outer loop link adaptation instance or with a transmission state; and adapt the number of outer loop link adaptation based on the monitored one or more variables.

Advantages corresponding to the above are obtained also by this aspect.

The object is according to a fourth aspect achieved by a computer program product comprising a computer program as above, and a computer readable means on which the computer program is stored.

Advantages corresponding to the above are obtained also by this aspect.

Further features and advantages of the present teachings will become clear upon reading the following description and the accompanying drawings.

BRIEF DESCRIPTION OF THE DRAWINGS

FIG. 3 illustrates a flow chart over dynamic creation of OLLA loops.

FIG. 4 illustrates a flow chart over dynamic merging of OLLA loops.

DETAILED DESCRIPTION

Figure 1A:
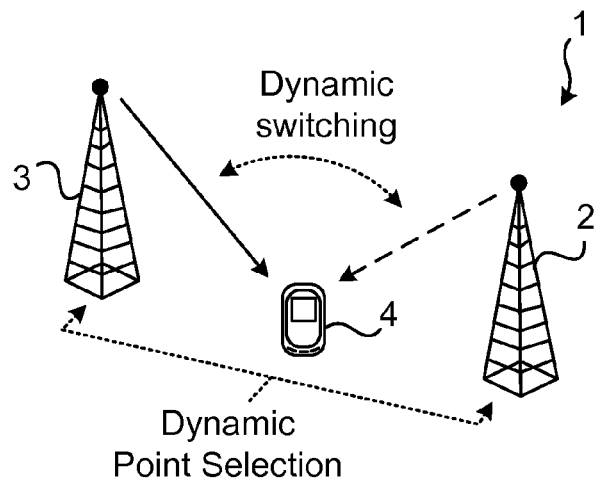
FIGS. 1a, 1b, 1c illustrate different CoMP scenarios.
Figure 1B:
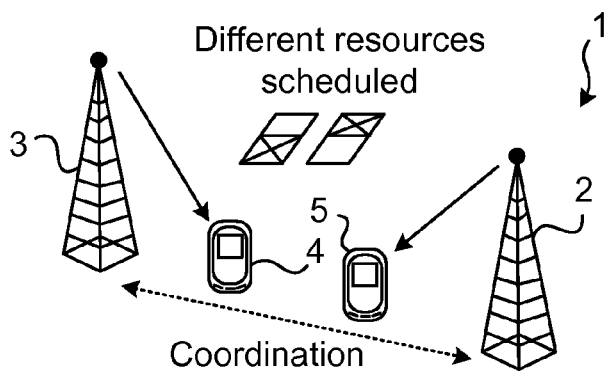
Figure 1C:
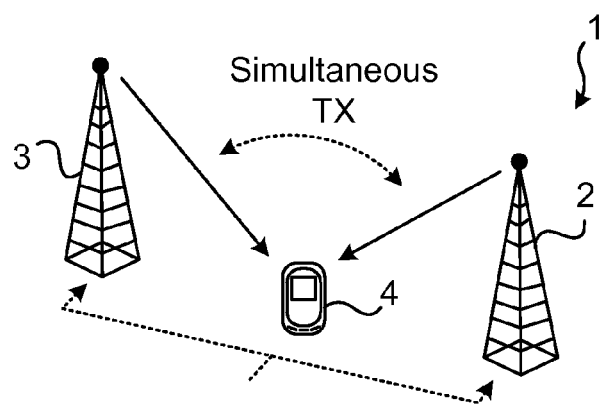

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

First, a few words on the terminology used throughout the description: In the following the term "transmission state" is defined in and for various scenarios. The term is important within this disclosure, and generally it refers to a particular transmission configuration that is deemed likely to result in a distinct radio condition, e.g. channel- and/or interference characteristics. One aspect of the transmission state is that the communication network (network in the following) must be able to classify the transmission state of a specific downlink transmission to a wireless device. This enables the network to associate measurements (e.g. ACK/NACK reports) to the different transmission states. For instance, the network can monitor reported ACK/NACKs of downlink transmissions, associate these to transmission states, and then compute transmission-state specific block error rates.

What defines a distinct transmission state may, for example, depend on transmission configurations that affect the channel characteristics, such as: the choice of transmission point, whether joint transmission is performed, selected transmission rank, or the choice of downlink carrier. Transmission states may also depend on the interference characteristics; which points that are transmitting in the vicinity of the wireless device, if dynamic blanking of transmission points is applied, any dynamic transmission power profile, or intra-cell co-scheduling in the case of multi-user MIMO. Another option is to couple a transmission state with a transmission configuration that matches a CSI process configuration (that was introduced in LTE Rel 11). That is, a transmission configuration where the desired signal is associated with a CSI-RS and the interference as seen from the wireless device matches a CSI-IM measurement.

The state variables and parameters associated with an outer loop link adaptation algorithm is herein denoted as an outer loop link adaptation (OLLA) instance. In the case of the jumping algorithm, the state is the SINR adjustment Δ, and the parameters includes the step size and the target BLER. Typically an eNodeB maintains separate OLLA instances, i.e. state variables, for each wireless device.

Below, more detailed examples of different transmission states are presented. It is however noted that the term is intended to cover different such transmission configurations, which may be dependent on the application at hand. All examples given in the following are not necessarily transmission states for a given application; e.g. for a certain application different point blanking patterns may constitute distinct transmission states, while in other applications the transmission state is not dependent on point blanking. It is also noted that the list is not exhaustive and is given purely to explain and exemplify the term transmission state as used in the context of the present teachings. The notion of a "transmission state" is sometimes denoted a CoMP state, or a CoMP scheme in case of CoMP, carrier- or point selection, or single-user/multi-user switching state in case of MU-MIMO.

In DL CoMP scenarios, transmission state is used to express that the wireless device is being served by a set of Transmission Points (TP) corresponding to a certain CoMP mode.

Example 1: when a wireless device in DPS mode is conditionally served by TP1 or TP2, transmission state 1 or 2 can refer to the state when the wireless device is being served by TP1 or TP2, respectively.

Example 2: when a wireless device in DPB mode is served by TP1 and neighboring transmission point is TP2, transmission state 1 or 2 can refer to the state when TP2 is blanked or not blanked.

Example 3: when a wireless device in NJT mode is conditionally served by TP1, or/and TP2, a transmission state can refer to the state when the wireless device is being served by any combination of TP 1 and 2, e.g. TP1 solely, TP2 solely, or jointly by TP1 and TP2, etc.

In DL MIMO scenarios:

Example 4: when a wireless device is conditionally scheduled in MU-MIMO mode and SU-MIMO (Single User-MIMO) (including SU-single input multiple output, SU-SIMO) mode, transmission state 1 or 2 can refer to the wireless device scheduled in MU-MIMO or SU-MIMO mode respectively.

Example 5: when a wireless device is scheduled in SU-MIMO mode, the transmission ranks supportable by the wireless device can be divided into different subsets, wherein each sub-set of transmission ranks corresponds to one transmission state.

In multiple-carrier (carrier aggregation) scenarios:

Example 6: when a wireless device can be scheduled with multiple carriers, one transmission state can refer to the wireless device being scheduled with a sub-set of carriers.

Briefly, the present teachings disclose different embodiments of a method performed in a network node, e.g. an eNodeB (enhanced Node B, also denoted eNB), for dynamically managing and conditionally assign one or multiple wireless devices with specific Outer Loop Link Adaption (OLLA) loops, herein also denoted OLLA instances, for cases when multiple (at least two) transmission states are dynamically used in the communication network. The method comprises conditional creation of new OLLA loops and/or merging multiple existing OLLA loops, in part based on measurements and feedback reports to optimize the system performance.

Embodiments of a method according to the present teachings are described in the following with reference mostly to DL CoMP scenarios. It is however noted that CoMP scenarios are used merely as illustrative examples, and that the teachings herein can be applied and implemented for other scenarios as well, such as for example carrier aggregation and frequency selective scheduling.

Figure 2:
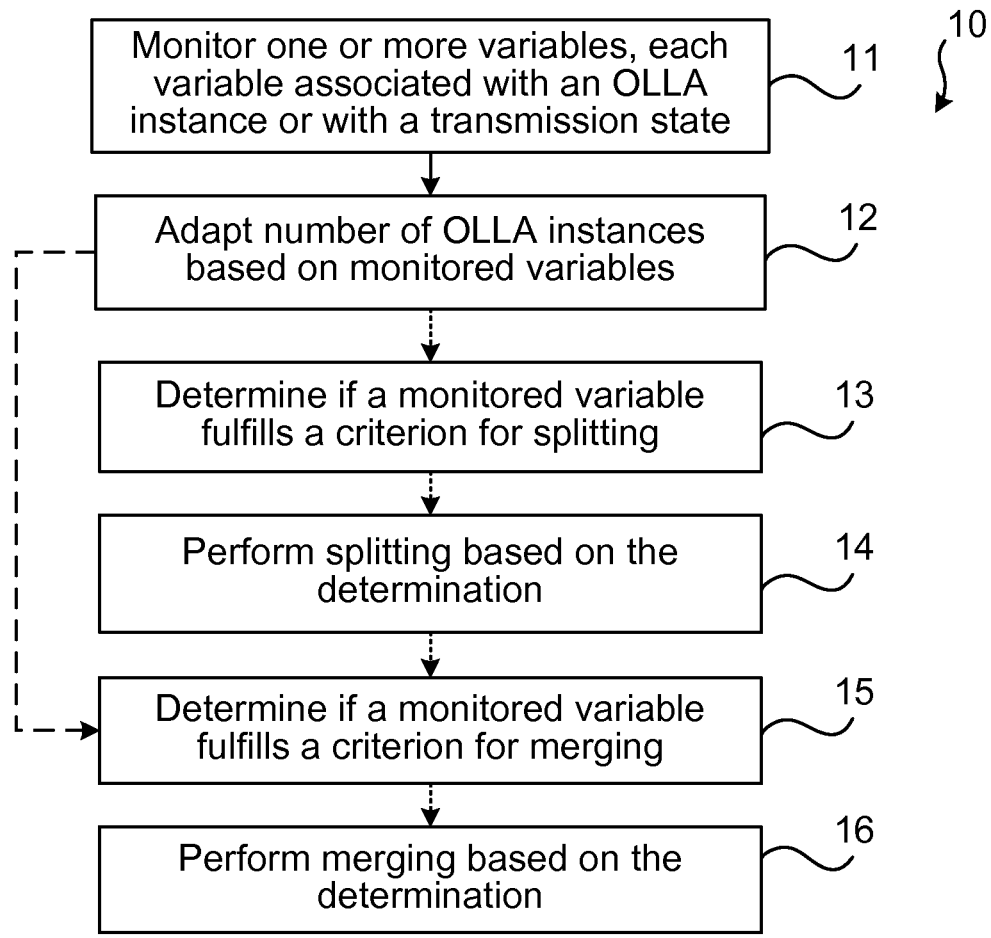
FIG. 2 illustrates a flow chart over steps of a method in a network node in accordance with the present teachings.

With reference to FIG. 2 a method 10 for dynamically managing outer loop link adaptation instances for a wireless device 4, 5 is described. The method 10 is performed in the network node 2, 3 with two or more transmission states. The network node 2, 3, e.g. an eNB, is thus configured to be able to support at least two transmission states to a wireless device. The method 10 comprises monitoring 11 one or more variables, wherein each variable is either associated with an outer loop link adaptation (OLLA) instance or with a transmission state. An OLLA instance is an OLLA loop using a particular OLLA algorithm comprising various state variables. The state variables are coupled to the OLLA instance. Different OLLA instances may for example share the same OLLA algorithm and algorithm parameters, but each instance comprises at least one state variable that is distinct. In the case of the jumping algorithm (Equation 1), the state variable is the SINR adjustment.

The method 10 further comprises adapting 12 the number of OLLA instances based on the monitored one or more variables.

The adapting 12 may comprise a sub-step of mapping transmission states onto the OLLA instances. That is, associating each transmission state with an OLLA instance such that any downlink transmission with a corresponding transmission state employs the associated OLLA instance in the link adaptation.

In an embodiment, the adapting 12 comprises splitting a set of two or more transmission states into sub-sets of transmission states and/or merging at least a first set of at least one transmission state with a set of at least a second transmission state. Embodiments on when to merge disjoint sets into one set of transmission states sharing one OLLA instance will be described later, while embodiments on when to split one set of transmission states sharing one OLLA instance into several such sets will be described next.

In an aspect thus, the adapting 12 of the number of OLLA instances comprises conditional creation of a new OLLA instance. That is, one set of transmission states associated with an OLLA instance is split into several sub-sets with new OLLA instances. The network node 2, 3 maintains statistics of BLER performance and/or reported CQI for each transmission state; and based e.g. on this information the network node 2, 3 may conditionally partition a set of transmission states corresponding to one OLLA instance into multiple child subsets of transmission states and create one new OLLA instance for each of the child subsets of transmission states. That is, each set of transmission states is associated with a respective OLLA instance. The partitioning may for example be conditioned on when the set of transmission states diverges over one or more thresholds in terms of a function of the maintained statistics.

According to this aspect, the network node 2, 3 thus splits or divides a set of transmission states sharing one OLLA instance into multiple child subsets of transmission states and creates one new OLLA instance for each of the child subsets of transmission states, when one or multiple conditions are fulfilled.

The criteria for splitting a set of transmission states sharing one OLLA instance may be selected to be triggered whenever different transmission states that share the same OLLA instance starts to show sufficiently different BLER performance and/or whenever the CSI representing the different transmission states shows significantly different reliability or robustness over time, i.e. CSI life time. In such cases, the transmission states are typically not suited to share the same OLLA instance, e.g. SINR adjustment value in the case of the jumping algorithm, and a splitting of the set of transmission states sharing one OLLA instance can be expected to improve overall link adaptation performance.

Reasons for diverging transmission states comprise multiple factors, for instance fundamental differences in the transmission states but also CQI measurement errors, the CQI measurement delay, signal processing impairments in the network node 2, 3, interference variations, channel variations, etc.

In various embodiments, the method 10 comprises monitoring or maintaining statistics of BLER performance and/or reported CQI for each transmission state so as to be used as input when determining if a set of transmission states using an OLLA instance should be partitioned.

For a transmission state, if the resulting BLER substantially differs from the BLER target, the adjusted SINR for MCS selection is not optimal. A much higher/lower BLER compared to the desired BLER target means that the adjusted SINR is too high/low. From this perspective, the measured BLER performance can be used to trigger the new OLLA instance creation. An example of one such procedure is described below.

For each transmission state, repeatedly verify that the measured BLER is within a predetermined tolerable interval around the BLER target $$\text{lower\_limit}(BLER_{tgt}) < BLER_{TSi} < \text{upper\_limit}(BLER_{tgt}) \quad \text{Equation 3}$$

where $\text{lower\_limit}(BLER_{tgt})$ is a predetermined value or a function that specifies the lowest acceptable BLER in relation to the target BLER, and $\text{upper\_limit}(BLER_{tgt})$ is a corresponding upper limit. If one or many of the transmission states are outside of the tolerance interval (as defined by Equation 3), a splitting of a set of transmission states sharing one OLLA instance is initialized.

When multiple transmission states share one OLLA instance, the SINR adjustment is the same for the different transmission states. In the case that the channel variations, CQI measurement error, or interference variations becomes considerably different between these transmission states, the BLER between different transmission states can become considerably large.

One challenge when analyzing the BLER performance of the individual transmission states is that the BLER scale is not a very suitable distance metric for this application. For example, if the BLER target is 10%, then it is not always the case that a measured BLER level of 25% is more off than a measured BLER level of 0.1%, even though the latter is closer to the BLER target in a linear scale. In its most general form, embodiments based on the following treats splitting criteria where the measured BLERs are scaled, in some embodiments non-linearly and in other embodiments taking the BLER target into account, to form a distance metric that is more suited for comparing whether or not a transmission state is diverging from other transmission states. The distance metric that is exemplified below is termed the additional SINR compensation. However, this may straightforwardly be generalized to any monotonic function that transforms a measured BLER, possibly in relation to the target BLER, with the purpose of providing a good distance metric between measured BLERs.

Based on the experienced BLER in relation to the BLER target, an approximate additional SINR compensation to the OLLA SINR adjustment value can be estimated for each transmission state separately, where the goal of the additional SINR compensation is to meet the BLER target for its associated transmission state. For a transmission state (TSi), an approximate additional SINR compensation can be estimated according to its experienced BLER and the BLER target by:

$$\Delta_{additional,TSi} = f(BLER_{TSi}, BLER_{Tgt}) \quad \text{Equation 4}$$

Such estimation can be done based on existing SINR to block error probability (BLEP) mapping theory.

As a particular example, the metric can be the difference in additional SINR compensation between any two transmission states (i and j). It can be calculated by $$\Delta_{additional,diff,ij} = \text{abs}(\Delta_{additional,TSi} - \Delta_{additional,TSj}) \quad \text{Equation 5}$$

The splitting criterion may then be to create new OLLA instances when $\Delta_{additional,diff,ij}$ exceeds a predetermined threshold for any two transmission states in the set.

By treating the additional SINR compensation as a stochastic process, the splitting criterion variable may comprise the correlation in additional SINR compensation between any two transmission states (i and j). It can be calculated $$C_{\Delta\_ij} = \frac{E(\Delta_{additional,TSi} - E(\Delta_{additional,TSi})) \cdot (\Delta_{additional,TSj} - E(\Delta_{additional,TSj}))}{\sqrt{E((\Delta_{additional,TSi} - E(\Delta_{additional,TSi}))^2) \cdot E((\Delta_{additionalTSj} - E(\Delta_{additional,TSj}))^2)}},$$
Equation 6 where $C_{\Delta\_ij}$ is the normalized cross correlation, and E(*) is the statistical expectation operator. When $C_{\Delta\_ij}$ is lower than a predetermined threshold, the channel compensation of channel quality estimation error of TSi and TSj has a low dependency, hence, separate OLLA loops can be created and applied for TS i and j, respectively.

In practice, the larger the channel variation the more difficult it is for an OLLA instance to track the channel quality estimation error, and typically channel variations results in more OLLA SINR backoff. This means that the desired SINR adjustment value can be indirectly reflected by the radio quality variation, and the required SINR compensation can be considerably different for transmission states that differ in the amount of channel quality variation. In order to protect the transmission states that have small radio quality variation, it is likely better to create separate OLLA instances for the transmission states that has the large and small radio quality variation separately if the radio quality variation difference is larger than a predetermined threshold between the transmission states. The radio quality may comprise one or more of: the CQI reported by the wireless device, the adjusted CQI in the eNB side, estimated SINR corresponding to certain transmission states in the eNB, the corresponding downlink path loss, etc.

Once the criterion for splitting a set sharing the same OLLA instance has been met, it remains to partition the set of transmission states into subsets, providing one new OLLA instance for each sub-set.

In an embodiment only the transmission state or states that triggered the split criterion is placed in new OLLA instance/instances, and the remaining transmission states proceeds with the original OLLA instance.

In another embodiment the partition of transmission states into new OLLA instances is determined based on the relation between the measured BLERs and the BLER target; The transmission states whose BLER is lower than the BLER target are placed into one subset and the transmission states whose BLER is higher than or equal to BLER target are included in another subset. Then separate OLLA instances are initiated for the two new child subsets of transmission states, potentially based on the state of the parent OLLA instance.

In yet another embodiment the partition is based on the average BLER between the transmission states with the highest and the lowest BLER respectively $$BLER_{thres} = \frac{1}{2}(BLER_{highest} + BLER_{lowest})$$
Equation 7

In line with this, the transmission states whose BLERs are higher than $BLER_{thres}$ are included into one child subset corresponding to OLLA instance 1 and the remaining transmission states whose BLERs are not higher than $BLER_{thres}$ are included into another child subset corresponding to OLLA instance 2.

In another embodiment the division into child subsets is based on transformed values of the measured BLERs, wherein a transform is introduced to provide a good distance metric between different BLER levels. Examples of such partitioning includes to partition along the mean median or covariance of the transformed measured BLERs, or by partitioning along the average of the highest and the lowest transformed measured BLER.

In an example of the above embodiment, the transformed BLER value is the average additional SINR compensation (see Equation 4), and the partitioning is done along the mean of the highest and the lowest additional SINR compensation.

$$\Delta_{additional,thres} = \frac{1}{2}(\Delta_{additional,highest} + \Delta_{additional,lowest})$$
Equation 8

In line with this, the transmission states whose $\Delta_{additional}$ are smaller than $\Delta_{additional,thres}$ are included into one child subset corresponding to a first OLLA instance and the remaining transmission states whose $\Delta_{additional}$ are not smaller than $\Delta_{additional,thres}$ are included into another child subset corresponding to a second OLLA instance.

In an example of the above embodiment, the transformed BLER value is the covariance of additional SINR compensation, and the partitioning is done along the covariance between the exempt transmission states and the transmission states with the highest or the lowest additional SINR compensation, denoted by $C_{\Delta\_i,highest}$ and $C_{\Delta\_i,lowest}$, respectively. In line with this, the transmission states whose $C_{\Delta\_i,highest}$ are smaller than predefined threshold are included into one child subset corresponding to a first OLLA instance and the remaining transmission states whose $C_{\Delta\_i,highest}$ are not smaller than the predefined threshold are included into another child subset corresponding to a second OLLA instance.

Once the new OLLA instances have been created they typically need to be initialized with a default variables, e.g. with a default SINR adjustment value.

In one embodiment the initial value/values is/are set to fixed predetermined value/values.

In another embodiment the newly created partitioned OLLA instances use the same parameter settings, e.g. step size and current SINR adjustment as its parent OLLA instance.

After partitioning a set of transmission states using an OLLA instance into two or more sets using different OLLA instances it is reasonable to assume that the SINR adjustments of the OLLA instance with transmission states that shows a historic BLER higher than the target BLER will eventually reduce its SINR adjustment relative to the parent OLLA instance adjustment, and vice versa. This observation can be used to initialize SINR adjustment values for the new OLLA instances. In one embodiment thus, the parameter settings for the new OLLA instances are selected on a per instance basis in part based on historical BLER statistics, and/or reported CQI for their respective sets of transmission states.

In the following two options are exemplified, by means of which a faster convergence is obtained:

Option 1; The last SINR adjustment value from the old OLLA instance plus a predetermined offset can be set as the initial SINR adjustment value for both OLLA instances $$\Delta_{high,0} = \Delta_{old} + \bar{\sigma}_{high}$$

$$\Delta_{low,0} = \Delta_{old} + \bar{\sigma}_{low},$$
Equation 9 where $\Delta_{old}$ is the last produced SINR adjustment of the old OLLA instance; $\bar{\sigma}_{high}$ and $\bar{\sigma}_{low}$ are the predetermined correct values for the new first OLLA instance (high BLER/high SINR deviation) and second OLLA instance (low BLER/small SINR deviation) respectively; $\Delta_{high,0}$ and $\Delta_{low,0}$ are initial SINR adjustment value (could be zero) corresponding to first and second OLLA instance, respectively.

Option 2; The last SINR adjustment value from the old OLLA instance plus an estimated correction value based on the measured BLER of the member transmission states. For example, the estimated correction can be constructed as the average in a transformed domain of transmission state specific entities that are obtained through a transformation of the measured BLER to a transmission-state specific SINR correction term, see Equation 4.

The various criteria presented above may be used in an iteration process. That is, if, after a round of splitting and partitioning, there are still transmission states in a set of transmission states sharing the same OLLA instance that meets any of the splitting criterion exemplified above, then the same splitting and partitioning procedure may be applied to these transmission states and OLLA instance until there are no transmission states using any of the OLLA instances that meet a splitting criterion.

When there is not sufficient statistics available, e.g. when there are too few ACK/NACK samples reported for an involved transmission state during some period of time, the creation of a new OLLA instance may be suspended until reliable statistics have been collected. Thereby, the problem mentioned earlier of maintaining multiple OLLA instances for different transmission states leading to fewer HARQ ACK/NACK samples for each loop is avoided.

Based on the above, various embodiments of the method 10 may be implemented. In an embodiment, the method 10 comprises determining 13 if a monitored variable fulfills a criterion for splitting a set of two or more transmission states, that are associated with the same outer loop link adaptation instance, into sub-sets of transmission states, each sub-set being associated with a different outer loop link adaptation instance, and then performing 14 the splitting based on the determination.

In an embodiment, the monitored variables comprises a block error rate, BLER, value and the criterion for splitting a set of two or more transmission states into sub-sets comprises a monitored BLER for any of the transmission states in the set differing from a BLER target defined by a BLER threshold.

In a variation of the above embodiment, the monitored variables comprise a metric that is a function of a block error rate, BLER, value of a transmission state, and the criterion for splitting two or more transmission states comprises any two or more transmission states having the BLER dependent variable fulfilling one or more of: a metric distance between any two transmission states being above a threshold value, a metric distance between any transmission state and a target variable level being above a threshold value, and a metric distance between any two transmission states being correlated over time, such that an estimated cross-correlation is below a threshold value.

In a variation of the above embodiment, the metric being a function of BLER is a monotonic non-linear function of a BLER value.

In a variation of the above embodiment, the BLER dependent metric is a signal to interference and noise ratio, SINR, compensation value $\Delta_{additional,Tsi}$ derived from the BLER value.

In an embodiment, the monitored variable comprises a measure of variability of a channel quality indicator, and wherein the criterion for splitting of two or more transmission states comprises the event that the monitored variability for any two transmission states differs above a threshold.

In a variation of the above embodiment, the measure of variability of a channel quality indicator comprises a geometric mean, arithmetic mean or median of the measured life times of values of the channel quality indicator.

In an embodiment, the method 10 comprises verifying, before performing 14 the splitting, that the variable or variables involved in triggering a splitting condition have been determined with a number of samples exceeding a threshold number.

In an embodiment, the performing 14 of the splitting comprises assigning new outer loop link adaptation instances only to the one or more transmission states triggering the criterion for splitting, the remaining transmission states proceeding with the initial outer loop link adaptation instance.

In another embodiment, the performing 14 of the splitting comprises partitioning the transmission states into two or more sub-sets in dependence on observed BLER values of the transmission states.

In a variation of the above embodiment, the partitioning comprises assigning a first OLLA instance to the one or more transmission states having a block error rate value lower than a set threshold value, and a second outer loop link adaptation instance to the one or more transmission states having a block error rate value higher than the set threshold value.

In variations of the above embodiments, a newly assigned outer loop link adaptation instance is initialized with a set of preconfigured parameters. For example, a preconfigured parameter may, in an embodiment, comprise a default signal to interference and noise ratio, SINR, adjustment value.

In another variation, a newly assigned OLLA instance is initialized with parameters relative to the previous OLLA instance.

In another aspect, the adapting 12 of the number of OLLA instances comprises conditional merging of multiple existing OLLA instances.

The network node 2, 3 maintains statistics on the SINR adjustments of the OLLA instances, and possibly also the BLER performance and/or reported CQI for each transmission state; and based on this information it may conditionally merge two or more OLLA instances into one OLLA instance. The merging may for example be conditioned on when the OLLA instances are deemed sufficiently similar, i.e. within an interval, in terms of a function of the maintained statistics.

According to this embodiment, the eNB decides to merge some OLLA instances based on the monitoring of one or multiple variables: difference in SINR adjustments between the OLLA instances, radio channel quality compensation correlation, radio quality variation difference between different subsets of transmission states that uses different OLLA instances.

More specifically, the eNB can determine to merge OLLA instances for example when one or multiple of the following criteria are fulfilled:

a. The SINR adjustment difference between two OLLA instances is within a predetermined interval: e.g. any differences in functions/filtering such as average over time of SINR adjustments between two OLLA instances is within a predetermined interval.

b. The radio channel quality error compensation correlation between different transmission states is higher than a predetermined threshold and SINR adjustment value difference is smaller than a predetermined threshold.

c. The radio quality variation difference between transmission states becomes smaller than a predetermined threshold.

In principle, when the SINR adjustments between two OLLA instances are smaller than a certain threshold, these two OLLA instances can be merged. In practice, such radio channel quality compensation between transmission states can also be reflected directly or indirectly by SINR adjustment value, SINR adjustment value correlation, radio quality variation (CQI, RSRP, path loss etc) difference etc. Such metrics can also be used to determine the OLLA instances merging.

In addition, certain filtering or statistical function can be applied for the mentioned metrics. Examples of such filtering include autoregressive filtering, or moving average filtering over some windowing period.

Merging of OLLA instances comprises merging the sets of transmission states into a unified set for the new OLLA instance, and may also comprise the process of determining a new set of OLLA parameters for the new OLLA instance.

The initial value of the merged OLLA instance can be the last produced SINR adjustment value by either a first or second OLLA instance or defined value between them, including the mean or the median, or a fixed predetermined value.

Other merging criterion may also be used. OLLA loop merging may be based on the SINR adjustment value difference. According to this criterion, the filtered SINR adjustment value can be determined periodically. Two OLLA instances can be merged when the difference between the filtered SINR adjustment values of two OLLA instances is smaller than a determined threshold.

$$\text{if}(\text{abs}(\Delta_{loop1}-\Delta_{loop2})<\Delta_{diff})$$

merge OLLA instance 1 and 2;

end  Equation 10

Still another merging criterion comprises merging OLLA instances based on the correlation between the compensation of channel quality estimation error.

As described earlier, the correlation between the compensation of channel quality estimation error of different OLLA instances can be estimated by treating the corresponding SINR adjustment values as stochastic processes. When the correlation value $C_{cq\_ij}$ is greater than a predetermined threshold, and $\text{abs}(E(\Delta_{TSi})-E(\Delta_{TSj}))$ is smaller than a threshold, these indicate that the SINR adjustment value of TSi and TSj has a strong dependency: the average SINR adjustment values between two OLLA instances are close enough and their variations are similar. Hence the OLLA instance merging can be decided on.

Still another merging criterion comprises merging OLLA instances based on the link quality variation difference. As mentioned earlier, the radio quality variation can indirectly reflect the desired SINR adjustment value for the transmission states corresponding to each OLLA instance. Hence, the average link quality variation difference between different transmission states corresponding to two OLLA instances can be used to determine the OLLA instance merging:

The link quality standard variation of each transmission states can be estimated periodically according to Equation 11.

$$\Omega_{cqi}=\sqrt{E[(cqi-E(cqi))^2]}$$  Equation 11, wherein $\Omega_{cqi}$ the statistical standard deviation or variation of the link quality and E(cqi) is the expected link quality.

The two OLLA instances can be determined to be merged when the difference between the average link quality variations is smaller than a predetermined threshold.

In still other embodiments, any combination of the above exemplified criteria may also be used.

Based on the above merging aspect, various embodiments of the method 10 may be implemented. In an embodiment, the method 10 comprises determining 15 if a monitored variable fulfills a criterion for merging at least a first set of at least one transmission state associated with a first OLLA instance, with a set of at least a second transmission state associated with a second OLLA instance, into a set of transmission states associated with the same OLLA instance, and performing 16 the merging in based on the determination.

In a variation of the above embodiment, the monitored variable comprises a temporally filtered signal to interference and noise ratio, SINR, adjustment value and the criterion for merging two or more transmission states comprises a difference in temporally filtered SINR adjustment value within a predetermined interval.

In another variation of the above embodiments, the performing 16 of the merging comprises merging at least a first set of at least one transmission state associated with a first outer loop link adaptation instance, with a set of at least a second transmission state associated with a second outer loop link adaptation instances, into a set of transmission states associated with a new outer loop link adaptation instance and assigning a new set of parameters for the newly assigned outer loop link adaptation instance.

In a variation of any of the described embodiments, the OLLA instance comprises a jumping algorithm that is correcting, by a set step-size, a radio quality compensation value used for correcting a downlink radio channel quality measurement report from the wireless device 4. As an example, the jumping algorithm defined in Equation 1 may be used.

It is noted that the steps of determining 13 fulfillment of splitting conditions, and performing 14 splitting based thereon on the one hand and the steps of determining fulfillment of merging conditions 15, and performing merging 16 based thereon on the other hand may be used and combined in various embodiments, as indicated by the dashed lines in FIG. 2. For example, in an embodiment, only splitting 13, 14 is done, in another embodiment, only merging 15, 16 is done, and in yet another embodiment, both splitting 13, 14 and merging 15, 16 criterion are checked and corresponding actions are taken.

The adapting 12 of the number of OLLAs as described above thus comprises, in various embodiments, performing splitting and/or merging of set(s) of transmission states based on different criterion. When a new session is set up for a wireless device, one OLLA instance can be created for each transmission state or all transmission states can share one OLLA instance. There are at least three other options to initialize the OLLA instance management:

1. Starting with one OLLA instance only for different transmission states until the channel quality statistics are sufficient.
2. Static configuration for loop setting, including predetermined parameters setting for OLLA instance,
3. Semi-dynamic configuration for loop setting, where historical partitioning of transmission states are taken into account. That is, if earlier wireless devices tend to split or merge certain OLLA instances these can be initialized in the historically typical final state as new OLLA sessions are set up.

FIGS. 3 and 4 exemplify the flow chart of dynamic creation of new OLLA instance and merging of two OLLA instances, respectively. For either case, the corresponding variables to determine the new OLLA instance creation/merging of existing OLLA instances are monitored periodically. At each monitoring period, the eNB 2, 3 determines either to create new OLLA instances or not/to merge the existing OLLA instances. The monitoring period could be time variant or semi-static. With reference now to FIGS. 3 and 4, the general procedures of splitting and merging, respectively, are summarized next.

FIG. 3 illustrates dynamic creation of OLLA instances, or equivalently, splitting of previous set(s) of transmission states. It is noted that it is not the transmission states themselves that are partitioned; it is the set of transmission states that is split up into sub-sets of transmission states, or equivalently, a number of sub-sets of transmission states are created. Sets of transmission states are associated with outer loop instances. It is note that a set may contain only one transmission state.

FIG. 3 thus illustrates a flow chart over dynamic creating of OLLA instances. The process 20 starts at box 21. In box 22, variables are monitored and it is determined if a variable monitoring period, the length of which can be set suitably, has ended. If the variable monitoring period has not ended, the flow continues box 25, which ends the process 20. If the variable monitoring period has ended, the flow continues box 23, wherein it is determined if two OLLA instances should be created in accordance with selected splitting criteria. If no criteria have been met, then the flow continues to box 25, which ends the process 20. If, in box 23, a criterion has been met, the flow continues to box 24, wherein the creation of a new OLLA instance is performed according to a selected procedure. The flow then continues to box 25, which ends the process 30. The process 20 may be repeated periodically or continuously.

FIG. 4 illustrates a flow chart over dynamic merging of OLLA loops. The process 30 starts at box 31. In box 32, variables are monitored and it is determined if a variable monitoring period, the length of which can be set suitably, has ended. If the variable monitoring period has not ended, the flow continues box 35, which ends the process 30. If the variable monitoring period has ended, the flow continues box 33, wherein it is determined if two OLLA instances should be merged in accordance with selected merging criteria. If no criteria have been met, then the flow continues to box 35, which ends the process 30. If, in box 33, a criterion has been met, the flow continues to box 34, wherein the merging into a new OLLA instance is performed according to a selected procedure. The flow then continues to box 35, which ends the process 30. The process 30 may be repeated periodically or continuously.

Figure 5:
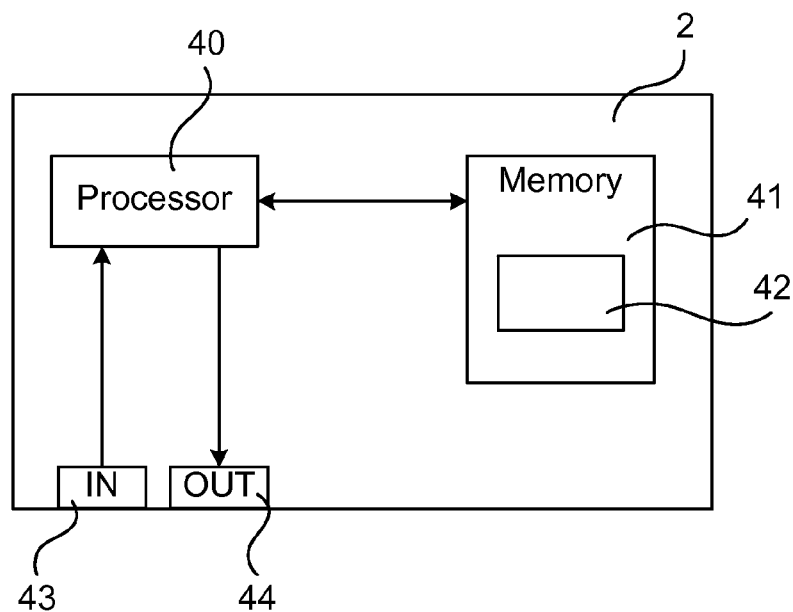
FIG. 5 illustrates schematically a network node and means for implementing methods of FIG. 3.

With reference to FIG. 5, the present teachings also encompass the network node 2. In particular, FIG. 5 illustrates schematically a network node 2 and means for implementing methods as described. The network node 2, and in particular a processor 40 thereof, is configured to dynamically manage outer loop link adaptation instances for a wireless device 4. The network node 2 is configured to provide two or more transmission states. The network node 2 comprises a processor 40 and memory 41. The memory 41 contains instructions executable by the processor 40, whereby the network node 2 is operative to perform any of the embodiments of the method 10 as described. In particular, the network node 2 is operative to:

monitor one or more variables, wherein each variable is either associated with an outer loop link adaptation instance or with a transmission state adapt the number of outer loop link adaptation instances based on the monitored one or more variables.

In an embodiment, the network node 2 is operative to adapt the number of outer loop link adaptation instances by splitting a set of two or more transmission states into sub-sets of transmission states and/or by merging at least a first set of at least one transmission state with a set of at least a second transmission state.

In an embodiment, the network node 2 is operative to:

determine if a monitored variable fulfills a criterion for splitting a set of two or more transmission states, that are associated with the same outer loop link adaptation instance, into sub-sets of transmission states, each sub-set associated with a different outer loop link adaptation instance, and perform the splitting in dependence on the determination.

In an embodiment, the network node 2 is operative to:

determine if a monitored variable fulfills a criterion for merging at least a first set of at least one transmission state associated with a first outer loop link adaptation instances, with a set of at least a second transmission state associated with a second outer loop link adaptation instances, into a set of transmission states associated with the same outer loop link adaptation instance, and perform the merging in dependence on the determination.

The processor 40 is provided using any combination of one or more of a suitable central processing unit (CPU), multiprocessor, microcontroller, digital signal processor (DSP), application specific integrated circuit etc., capable of executing software instructions stored in a memory 41, which can thus be a computer program product. The processor 40 can be configured to execute the various embodiments of the method as described.

The memory 41 can be any combination of read and write memory (RAM) and read only memory (ROM). The memory 41 may also comprise persistent storage, which may, for example, be any single one or combination of magnetic memory, optical memory, solid state memory or even remotely mounted memory.

The network node further comprises an input/output device 43, 44, embodied as one or more separate units or as a single unit. By means of such input device(s) 43, the network node 2 may receive data from the wireless device 4 (via antennas, not illustrated) and from other network nodes 3 (e.g. via interconnecting cables, not illustrated). By means of such output device(s) 44 the network node 2 may transmit data to the wireless device 5 (via antennas, not illustrated) and to other network nodes 3 (e.g. via interconnecting cables, not illustrated). The input device(s) 43 and the output device(s) 44 are operatively connected to the processor 40, which is thus able to transmit instructions to the wireless device 4 (via antennas, not illustrated), e.g. based on information received from the wireless device 4. Other components of the network node 2 are omitted in order not to obscure the concepts presented herein.

With reference still to FIG. 5, the present teachings also encompass computer programs and computer program products.

The computer program product, e.g. the memory 41, thus comprises instructions executable by the processor 40. Such instructions may be comprised in a computer program 42, or in one or more software modules or function modules.

Figure 6:
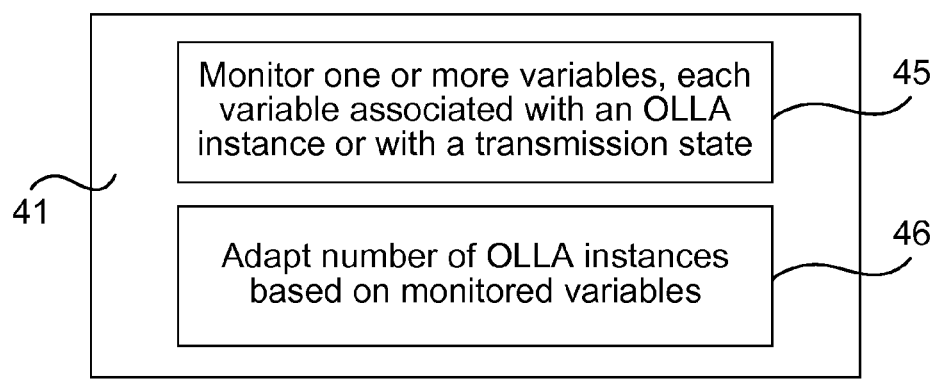
FIG. 6 illustrates a computer program product comprising functions modules/software modules for implementing methods of FIG. 2.

An example of an implementation using functions modules/software modules is illustrated in FIG. 6, in particular illustrating a computer program product comprising functions modules for implementing methods of FIG. 3. The memory 41 comprises means 45, in particular a first function module 45, for monitoring one or more variables, each variable is either associated with an OLLA instance or with a transmission state. The memory 41 comprises means 46, in particular a second function module 46, for adapting the number of OLLA instances based on the monitored one or more variables.

The computer program 42 is provided for a network node 2 with two or more transmission states for dynamically managing outer loop link adaptation instances for a wireless device 4. The computer program 42 comprises computer program code, which, when run on the network node 2, and in particular the processor thereof, causes the network node 2 to monitor one or more variables, each variable is either associated with an outer loop link adaptation instance or with a transmission state; and adapt the number of outer loop link adaptation based on the monitored one or more variables.

The teachings also encompass the computer program product 41 comprising a computer program 42 as above, and a computer readable means on which the computer program 42 is stored. On this computer readable means the computer program 42 can be stored, which computer program can cause a processor 40 to execute a method according to embodiments described herein. For example, the computer program product may comprise an optical disc, such as a CD (compact disc) or a DVD (digital versatile disc) or a Blu-Ray disc. As explained above, the computer program product could also be embodied in a memory of a device, such as the processor 40 of the network node 2.

The teachings presented herein have mainly been described and exemplified by CoMP. However, the teachings can also be extended to be used for multiple carrier transmission scenarios or multiple band cases, which will be exemplified next.

Example 1: Multiple Carriers and Carrier Aggregation

In multiple carrier case, due to the intra- or inter-cell interference differences or differences in fading properties between the carriers, the link of different carriers or bands may behave very differently. For such cases the idea of multiple OLLA instance management can be successfully applied. In some cases it may be favorable to use separate OLLA instances for different carrier sets, while in other cases multiple existing OLLA instances could be merged according to the similar criteria that have already been mentioned.

Example 2: Frequency Selective Scheduling (FSS)

In FSS scheduling in a wideband radio system, sub-band CQIs are used, different set of sub-bands may experience different fading and interferences and separate OLLA instances maybe used for different sub-sets of sub-bands. Criteria similar to the already mentioned criteria can be used for dynamic OLLA instance creation and merging of multiple existing instances.

Example 3: Quasi-Collocation of CRS/CSI-RS

In these scenarios, the mismatch of link quality measurements due to Quasi-collocation might be changed due to the TX selection or joint TX status change, the teachings as present can be applied.

The invention has mainly been described herein with reference to a number of embodiments. However, as is appreciated by a person skilled in the art, other embodiments than the particular ones disclosed herein are equally possible within the scope of the invention, as defined by the appended patent claims.

The invention claimed is:

1. A method performed in a network node with two or more transmission states for dynamically managing outer loop link adaptation instances for a wireless device, the method comprising:
   monitoring one or more variables, wherein each variable is either associated with an outer loop link adaptation instance or with a transmission state,
   adapting a number of outer loop link adaptation instances based on the monitored one or more variables by merging at least a first set of at least one transmission state associated with first outer loop link adaptation instances, with a set of at least a second transmission state associated with second outer loop link adaptation instances, into a set of transmission states associated with a new outer loop link adaptation instance,
   determining if a monitored variable of the monitored one or more variables fulfills a criterion for merging at least the first set of at least one transmission state associated with first outer loop link adaptation instances, with the set of at least a second transmission state associated with second outer loop link adaptation instances, into the set of transmission states associated with the new outer loop link adaptation instance, and
   performing the merging based on the determination that the monitored variable of the monitored one or more variables fulfills the criterion for merging.

2. The method as claimed in claim 1, wherein the adapting comprises a sub-step of mapping transmission states onto the outer loop link adaptation instances.

3. The method as claimed in claim 1, comprising:
   adapting a number of outer loop link adaptation instances based on the monitored one or more variables by splitting a set of two or more transmission states into sub-sets of transmission states with each sub-set associated with a different outer-loop link adaptation instance;
   determining if a monitored variable of the monitored one or more variables fulfills a criterion for splitting the set of two or more transmission states, that are associated with a same outer loop link adaptation instance, into the sub-sets of transmission states where each sub-set is associated with a different outer loop link adaptation instance, and
   performing the splitting based on the determination that the monitored variable of the monitored one or more variables fulfills the criterion for splitting.

4. The method as claimed in claim 3, wherein the monitored one or more variables comprises a block error rate, BLER, value and the criterion for splitting the set of two or more transmission states into sub-sets comprises a monitored BLER for any of the transmission states in the set differing from a BLER target defined by a BLER threshold.

5. The method as claimed in claim 3, wherein the monitored one or more variables comprise a metric that is a function of a block error rate, BLER, value of a transmission state, and the criterion for splitting the set of two or more transmission states comprises any two or more transmission states having a BLER dependent variable fulfilling one or more of: a metric distance between any two transmission states being above a threshold value, a metric distance between any transmission state and a target variable level being above a threshold value, and a metric distance between any two transmission states being correlated over time, such that an estimated cross-correlation is below a threshold value.

6. The method as claimed in claim 5, wherein the metric being a function of BLER is a monotonic non-linear function of a BLER value.

7. The method as claimed in claim 6, wherein the BLER dependent metric is a signal to interference and noise ratio, SINR, compensation value derived from the BLER value.

8. The method as claimed in claim 3, wherein the monitored variable comprises a measure of variability of a channel quality indicator, and wherein the criterion for splitting of two or more transmission states comprises an event that the monitored variability for any two transmission states differs above a threshold.

9. The method as claimed in claim 8, wherein the measure of variability of a channel quality indicator comprises a geometric mean, arithmetic mean or median of the measured life times of values of the channel quality indicator.

10. The method as claimed in claim 3, comprising verifying, before performing the splitting, that the monitored variable involved in triggering the criterion for splitting have been determined with a number of samples exceeding a threshold number.

11. The method as claimed in claim 3, wherein performing the splitting comprises assigning new outer loop link adaptation instances only to one or more transmission states triggering the criterion for splitting, the remaining transmission states proceeding with the initial outer loop link adaptation instance.

12. The method as claimed in claim 3, wherein performing the splitting comprises partitioning the transmission states into two or more sub-sets in dependence on observed BLER values of the transmission states.

13. The method as claimed in claim 12, wherein the partitioning comprises assigning a first outer loop link adaptation instance to the one or more transmission states having a block error rate value lower than a set threshold value, and a second outer loop link adaptation instance to the one or more transmission states having a block error rate value higher than the set threshold value.

14. The method as claimed in claim 11, wherein a newly assigned outer loop link adaptation instance is initialized with a set of preconfigured parameters.

15. The method as claimed in claim 14, wherein a preconfigured parameter comprises a default signal to interference and noise ratio, SINR, adjustment value.

16. The method as claimed in claim 11, wherein a newly assigned outer loop link adaptation instance is initialized with parameters relative to the previous outer loop link adaptation instance.

17. The method as claimed in claim 1, wherein the monitored variable comprises a temporally filtered signal to interference and noise ratio, SINR, adjustment value and the criterion for merging two or more transmission states comprises a difference in temporally filtered SINR adjustment value within a predetermined interval.

18. The method as claimed in claim 1, wherein the performing of the merging comprises merging at least the first set of at least one transmission state associated with a first outer loop link adaptation instance, with the set of at least a second transmission state associated with a second outer loop link adaptation instances, into a set of transmission states associated with the new outer loop link adaptation instance and assigning a new set of parameters for the new outer loop link adaptation instance.

19. The method as claimed in claim 1, wherein the outer loop link adaptation instance comprises a jumping algorithm that is correcting, by a set step-size, a radio quality compensation value used for correcting a downlink radio channel quality measurement report from the wireless device.

20. The method of claim 1 further comprising
dynamically assigning to the wireless device the different outer loop link adaptation instance associated with each sub-set of transmission states and/or dynamically assigning to the wireless device the new outer loop link adaptation instance associated with the set of transmission states.

21. A network node with two or more transmission states for dynamically managing outer loop link adaptation instances for a wireless device, the network node comprising a processor and memory, the memory containing instructions executable by the processor, whereby the network node is operative to:
monitor one or more variables, wherein each variable is either associated with an outer loop link adaptation instance or with a transmission state,
adapt a number of outer loop link adaptation instances based on the monitored one or more variables by merging at least a first set of at least one transmission state associated with first outer loop link adaptation instances, with a set of at least a second transmission state associated with second outer loop link adaptation instances, into a set of transmission states associated with a new outer loop link adaptation instance,
determine if a monitored variable of the monitored one or more variables fulfills a criterion for merging at least the first set of at least one transmission state associated with first outer loop link adaptation instances, with the set of at least a second transmission state associated with second outer loop link adaptation instances, into the set of transmission states associated with the new outer loop link adaptation instance, and
perform the merging in dependence on the determination that the monitored variable of the monitored one or more variables fulfills the criterion for merging.

22. The network node as claimed in claim 21, further being operative to:
adapt a number of outer loop link adaptation instances based on the monitored one or more variables by splitting a set of two or more transmission states into sub-sets of transmission states with each sub-set associated with a different outer-loop link adaptation instance;
determine if a monitored variable of the monitored one or more variables fulfills a criterion for splitting the set of two or more transmission states, that are associated with a same outer loop link adaptation instance, into the sub-sets of transmission states where each sub-set is associated with a different outer loop link adaptation instance, and
perform the splitting in dependence on the determination that the monitored variable of the monitored one or more variables fulfills the criterion for splitting.

23. The network node as claimed in claim 21, whereby the network node is operative to:

dynamically assign to the wireless device the different outer loop link adaptation instance associated with each sub-set of transmission states and/or dynamically assign to the wireless device the new outer loop link adaptation instance associated with the set of transmission states.

24. A computer program product for a network node with two or more transmission states for dynamically managing outer loop link adaptation instances for a wireless device, the computer program product comprising a non-transitory computer readable storage medium storing computer program code, which, when run by a processor on the network node causes the network node to:
monitor one or more variables, each variable is either associated with an outer loop link adaptation instance or with a transmission state,
adapt a number of outer loop link adaptation instances based on the monitored one or more variables by merging at least a first set of at least one transmission state associated with first outer loop link adaptation instances, with a set of at least a second transmission state associated with second outer loop link adaptation instances, into a set of transmission states associated with a new outer loop link adaptation instance,
determine if a monitored variable of the monitored one or more variables fulfills a criterion for merging at least the first set of at least one transmission state associated with first outer loop link adaptation instances, with the set of at least a second transmission state associated with a second outer loop link adaptation instances, into the set of transmission states associated with the new outer loop link adaptation instance, and
perform the merging in dependence on the determination that the monitored variable of the monitored one or more variables fulfills the criterion for merging.

* * * * *